United States Patent [19]

Barthold et al.

[11] Patent Number: 4,814,394
[45] Date of Patent: Mar. 21, 1989

[54] POLYETHERS OBTAINABLE BY REACTING ALKYLOLATED BIS-(4-HYDROXYPHENYL)-METHANES WITH POLYALKYLENE OXIDES, AND THEIR USE AS OIL DEMULSIFIERS

[75] Inventors: Klaus Barthold, Mannheim; Knut Oppenlaender, Ludwigshafen; Juergen Lasowski, Limburgerhof; Richard Baur, Mutterstadt, all of Fed. Rep. of Germany

[73] Assignee: BASF Aktiengesellschaft, Ludwigshafen, Fed. Rep. of Germany

[21] Appl. No.: 43,591

[22] Filed: Apr. 28, 1987

[30] Foreign Application Priority Data

May 22, 1986 [DE] Fed. Rep. of Germany ....... 3617178

[51] Int. Cl.[4] .................. C08L 61/06; C08G 65/32
[52] U.S. Cl. .................... 525/405; 252/331; 252/358; 525/507
[58] Field of Search ............ 525/405, 409, 507; 252/331, 358; 528/129

[56] References Cited

U.S. PATENT DOCUMENTS 4,117,031 9/1978 Macenka et al. ............ 252/331 X
4,465,817 8/1984 Billenstein et al. ............ 525/507

FOREIGN PATENT DOCUMENTS 0097897 1/1984 European Pat. Off. .
2445873 4/1976 Fed. Rep. of Germany .

*Primary Examiner*—Theodore E. Pertilla
*Attorney, Agent, or Firm*—Keil & Weinkauf

[57] ABSTRACT

Polyethers with are suitable as oil demulsifiers are obtainable by reacting
(A) a polyalkylene oxide obtained from ethylene oxide and propylene oxide and containing in total from 5 to 200 alkylene oxide units with
(B) an alkylolation product of a low molecular weight aldehyde and a bis-(4-hydroxyphenyl)-methane of the general formula II

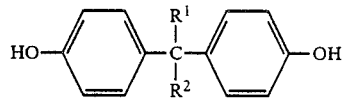

wherein $R^1$ and $R^2$ may be identical or different and are each hydrogen, low molecular weight alkyl, phenyl, carboxyl or low molecular weight alkoxycarbonyl, the molar reaction ratio of the compound of the formula II to the alkylolating aldehyde being from 1:1 to 1:4, at from 100° to 180° C. in the presence of an acidic catalyst with removal of the water of reaction, the weight ratio of A to B being from 5:1 to 1:3.

4 Claims, No Drawings

POLYETHERS OBTAINABLE BY REACTING ALKYLOLATED BIS-(4-HYDROXYPHENYL)-METHANES WITH POLYALKYLENE OXIDES, AND THEIR USE AS OIL DEMULSIFIERS

The present invention relates to novel polyethers which are suitable as oil demulsifiers and are obtainable by crosslinking polyalkylene oxides with alkylolated bis-(4-hydroxyphenyl)-methanes and their use for the rapid dehydration of crude oils.

It is known that, after an initial phase in which virtually pure oil is recovered, the major part of the oil produced is obtained as a water-in-oil emulsion. However, the water has to be separated off or reduced to an acceptable concentration before transportation. This is done by breaking the emulsion, in general by adding oil demulsifiers, the separation being facilitated and accelerated by heating the oil. The compositions of the oil emulsions vary greatly depending on the source; a large number of different oil demulsifiers are therefore in use worldwide in order to achieve optimum demulsification results. However, there is great interest in improved demulsifiers which permit more rapid separation into oil and water in a very wide variety of oil emulsions.

Known demulsifiers are ethylene oxide/propylene oxide block polymers, oxyalkylated alkylphenol formaldehyde resins, oxyalkylated polyamines, polymers containing polyalkylene oxide units and crosslinked products of the above compounds. EP-A1 No. 97 897 and German Published Application DAS No. 2,445,873 describe crosslinked products of polyalkylene oxides and nitrogen-containing polyalkylene oxides with, for example, methylolated phenol, and the use of the crosslinked products as oil demulsifiers.

For this purpose, phenol is subjected to a base-catalyzed reaction with formaldehyde or acetaldehyde in a ratio of from 1:1 to 1:3, preferably from 1:1.8 to 1:2.2, at from 50° to 80° C. Mono-, di- or trimethylolphenols are formed, depending on the ratio of the reactants, and are subjected to a subsequent acid-catalyzed reaction with polyalkylene oxides or nitrogen-containing polyalkylene oxides with elimination of water to give crosslinked products. The highest efficiencies are achieved using trimethylolphenol, prepared by reacting 3 moles of formaldehyde and 1 mole of phenol by an alkali-catalyzed reaction. However, some of the reactions with trimethylolphenol give rise to problems owing to precipitation.

It is an object of the present invention to propose improved oil demulsifiers which have excellent demulsifying properties without possessing the stated disadvantages.

We have found that this object is achieved, according to the invention, by the use of compounds which have an even higher degree of methylolation, and which have a substantially better action and do not produce any precipitates during condensation. Reaction products of bis(4-hydroxyphenyl)-methane and its derivatives, eg. 2,2-bis-(4-hydroxyphenyl)-propane, with aliphatic aldehydes in a ratio of from 1:1 to 1:4 have proven very suitable as compounds having a higher degree of methylolation.

The present invention therefore relates to condensates which are obtainable by reacting (A) a polyalkylene oxide obtained from ethylene oxide and propylene oxide and containing in total from 5 to 200 alkylene oxide units with (B) an alkylolation product of a bis-(4-hydroxyphenyl)methane of the formula II

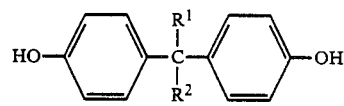

where $R^1$ and $R^2$ may be identical or different and are each hydrogen, low molecular weight alkyl, phenyl, carboxyl or low molecular weight alkoxycarbonyl, $R^1$ preferably being ethyl, phenyl, carboxyl, methoxycarbonyl or, in particular, hydrogen or methyl and $R^2$ preferably being ethyl, phenyl, or, in particular, hydrogen or methyl, obtained by reaction with a low molecular weight aldehyde as an alkylolating agent, eg. acetaldehyde or propionaldehyde or in particular formaldehyde, in a molar ratio of bis-(4-hydroxyphenyl)-methane to aldehyde of from 1:1 to 1:4, preferably from 1:3 to 1:4, in the presence of an alkaline catalyst at from 50° to 80° C. in the course of from 1 to 4 hours, component A being reacted with component B in a weight ratio of from 1:3 to 5:1, preferably from 1:2 to 2:1, in the presence of an acidic catalyst at from 100° to 180° C. with removal of the water of reaction, with or without the use of an azeotropic entraining agent, such as toluene or xylene.

The preparation of the intermediates from bis-(4-hydroxyphenyl)-methanes, in particular 2,2-bis-(4-hydroxyphenyl)-propane and bis-(4-hydroxyphenyl)-methane, and the aldehydes is carried out in the presence of an alkaline catalyst, eg. sodium hydroxide, potassium hydroxide or an Na or K alcoholate, in aqueous solution at from 50° to 80° C. in the course of from 1 to 4 hours. The upper temperature limit should be observed, in order to avoid further condensation to resin-like products. The molar ratio of the bis-(4-hydroxyphenyl)-methane to the aldehyde is from 1:1 to 1:4, preferably from 1:3 to 1:4. The amount of alkaline catalyst is as a rule from 0.5 to 15, preferably from 2 to 6, % by weight, based on the amount of bis-(4-hydroxyphenyl)-methane used. Where formaldehyde is used, it is advantageously added in the form of a 35% strength aqueous solution. The solubility of the bis-(4-hydroxyphenyl)-methanes is generally not sufficient to produce a clear aqueous solution; in these cases, the component is suspended in 50–90% by weight, based on the mixture, of water, the catalyst is added and the aldehyde is then metered in at from 50° to 60° C. in the course of from 1 to 2 hours. The alkylolation, in particular the methylolation, renders the bis-(4-hydroxyphenyl)-methane derivatives water-soluble, and a homogeneous solution of the methylol compounds is obtained after reaction for a further 2–4 hours at from 60° to 80° C.

The polyalkylene oxides (A) are random polymers or, preferably, block polymers starting from ethylene glycol or, preferably, from propylene glycol as an initiator. Particularly suitable polyalkylene glycols are those of the formula I

where A-O and B-O may be identical or different and are each a radical of ethylene oxide or propylene oxide and x and y are each from 0 to 100, with the proviso that the sum x+y is from 5 to 200. Particularly preferred polyalkylene oxides of the formula I are those in which x is from 1 to 40, y is from 5 to 60 and x+y is from 8 to 100.

The polyalkylene oxides are synthesized by known processes, by subjecting ethylene oxide and/or propylene oxide to an addition reaction with ethylene glycol or propylene glycol in the presence of a basic catalyst, preferably sodium hydroxide or potassium hydroxide, at from 100° to 160° C. in an autoclave under 6 bar. The amount of catalyst is in general from 0.25 to 5%, preferably from 0.5 to 2%, based on the starting material. The molar ratio of polyethylene oxide to polypropylene oxide varies from 0:100 to 100:0 and is preferably from 1:30 to 8:1.

After the addition of the polyalkylene oxides to the aqueous solution of the alkylolated bis-(4-hydroxyphenyl)-methanes, the mixture is neutralized to pH 6-7 with a suitable acid and, if required, diluted with water, after which the etherification is carried out at a reaction temperature of from 100° to 180° C. with removal of the water of reaction. The weight ratio of polyalkylene oxide to the alkylolated component is from 1:3 to 5:1, preferably from 1:2 to 2:1. As a rule, mineral acids or organic acids are used as catalysts, dodecylbenzenesulfonic acid and p-toluenesulfonic acid being preferred. Complete removal of the water of reaction is effected, for example, by distillation under reduced pressure or by azeotropic distillation using a known entraining agent (eg. xylene or toluene). The products according to the invention are very efficient demulsifiers for crude oil emulsions when used in amounts of from 2 to 100 g per tonne.

The Examples which follow illustrate the invention. Parts are by weight.

EXAMPLES (A) Polyalkylene oxides 76 g of propylene glycol and 0.8 g of potassium hydroxide are initially taken in an autoclave under a nitrogen atmosphere, and reacted with 928 g of propylene oxide at from 130° to 140° C. under 6 bar. 110 g of ethylene oxide are then added in a second stage at from 120° to 130° C., and, toward the end of the reaction, the temperature is kept at 140° C. for a further hour in order to complete the reaction. The molecular weight calculated from the measured OH number is 1100. This is Example A1 in the Table below. The products of Examples A2 to A13 are obtained in a similar manner, using the amounts of starting materials stated in the Table.

TABLE 1

| | | | | Polyalkylene oxides | | | |
|---|---|---|---|---|---|---|---|
| Example | Alcohol | Parts of alcohol | Catalyst | Parts of catalyst | Parts of propylene oxide | Parts of ethylene oxide | Molecular weight calc. from OH number |
| A1 | propylene glycol | 76 | KOH | 0.8 | 928 | 110 | 1100 |
| A2 | propylene glycol | 76 | KOH | 0.8 | 1131 | 510 | 1700 |
| A3 | propylene glycol | 76 | KOH | 0.8 | 1682 | 211 | 1800 |
| A4 | propylene glycol | 76 | KOH | 0.8 | 1682 | 458 | 2200 |
| A5 | propylene glycol | 76 | KOH | 0.8 | 1682 | 1531 | 3000 |
| A6 | propylene glycol | 76 | KOH | 0.8 | 1682 | 6512 | 8500 |
| A7 | propylene glycol | 76 | KOH | 0.8 | 2282 | 264 | 2600 |
| A8 | propylene glycol | 76 | KOH | 0.8 | 2691 | 880 | 3650 |
| A9 | propylene glycol | 76 | KOH | 0.8 | 2691 | 1848 | 4600 |
| A10 | propylene glycol | 76 | KOH | 0.8 | 3190 | 299 | 3550 |
| A11 | propylene glycol | 76 | KOH | 0.8 | 3190 | 3256 | 6500 |
| A12 | propylene glycol | 76 | KOH | 0.8 | 1924 | — | 2000 |
| A13 | ethylene glycol | 60 | KOH | 0.6 | — | 1440 | 1500 |

(B) Reaction of bis-(4-hydroxyphenyl)-methanes with aldehydes

A solution of 10 g of sodium hydroxide in 10 g of water is added dropwise, at 50° C., to a suspension of 456.6 g of 2,2-bis-(4-hydroxyphenyl)-propane (component (1) in 500 ml of water. Thereafter, 800 g of a 30% strength aqueous formaldehyde solution are added dropwise at 60° C., and the reaction is continued for 2.5 hours at this temperature. This gives a clear solution of the methylol product. This is Example B1 in the Table below. Examples B2 to B4 are obtained in the same manner.

TABLE 2

| | Reaction of bis-(4-hydroxyphenyl)-methanes with aldehydes | | | | | | |
|---|---|---|---|---|---|---|---|
| Example | Component 1 | Parts of component 1 | Catalyst | Parts of catalyst | Aldehyde | Parts of aldehyde | Content of active ingredient |
| B1 | 2,2-bis-(4-hydroxyphenyl)-propane | 457 | NaOH | 10 | formaldehyde | 240 | 40% |
| B2 | 2,2-bis-(4-hydroxyphenyl)-propane | 457 | NaOH | 10 | formaldehyde | 180 | 40% |
| B3 | bis-(4-hydroxyphenyl)-methane | 400 | NaOH | 10 | formaldehyde | 240 | 40% |
| B4 | bis-(4-hydroxyphenyl)-methane | 400 | NaOH | 10 | formaldehyde | 180 | 40% |

(C) Etherification of the polyalkylene oxides from (A) with the methylol compounds from (B)

390 g of the polyalkylene oxide from Example A3 (component 1) are added to 88 g of the solution from Example B1 (component 2) at 50° C., and the mixture is diluted with 50 ml of water. The pH of the solution is brought to 6.3 by adding dodecylbenzenesulfonic acid. The solution is heated to 80° C., and the pressure is carefully reduced by means of a water pump. The major part of the water is distilled off at 80°-130° C. Toward the end of the reaction, the mixture is heated at 150° C. for a further 5 hours and residual water of reaction is removed under reduced pressure. A brownish, clear, highly viscous substance is obtained. This is the product of Example C1 in Table 3. The products of Examples C2 to C15 are prepared by a similar procedure, a larger amount of water having to be added to some batches in order to bring the pH to 6.3-6.8. When the pressure is reduced by means of the water pump, foaming of the mixture occurs in many Examples. However, by adding a small amount of an antifoam, etherification can be carried out for these mixtures too. In Examples C9, C10 and C12, the mixture was diluted by adding xylene toward the end of the reaction and the residual water was separated off by azeotropic distillation.

TABLE 3

Etherification of the products from A with the products from B

| Example | Component 1 | Component 2 | Parts of 1 | Parts of 2 | Acid |
|---|---|---|---|---|---|
| C1 | A3 | B1 | 390 | 88 | dodecylbenzenesulfonic acid |
| C2 | A5 | B1 | 290 | 44 | dodecylbenzenesulfonic acid |
| C3 | A11 | B1 | 163 | 11 | dodecylbenzenesulfonic acid |
| C4 | A4 | B1 | 220 | 44 | dodecylbenzenesulfonic acid |
| C5 | A4 | B2 | 220 | 119 | dodecylbenzenesulfonic acid |
| C6 | A2 | B2 | 170 | 80 | dodecylbenzenesulfonic acid |
| C7 | A5 | B2 | 150 | 40 | dodecylbenzenesulfonic acid |
| C8 | A9 | B2 | 460 | 80 | dodecylbenzenesulfonic acid |
| C9 | A4 | B1 | 220 | 88 | dodecylbenzenesulfonic acid |
| C10 | A5 | B1 | 300 | 88 | dodecylbenzenesulfonic acid |
| C11 | A8 | B3 | 365 | 40 | dodecylbenzenesulfonic acid |
| C12 | A1 | B3 | 110 | 80 | dodecylbenzenesulfonic acid |
| C13 | A7 | B3 | 260 | 40 | dodecylbenzenesulfonic acid |
| C14 | A6 | B4 | 850 | 73 | dodecylbenzenesulfonic acid |
| C15 | A10 | B4 | 355 | 73 | dodecylbenzenesulfonic acid |
| C16 | A7 | B2 | 260 | 80 | dodecylbenzenesulfonic acid |
| C17 | A7 | B1 | 260 | 88 | dodecylbenzenesulfonic acid |
| C18 | A7 | B1 | 390 | 88 | dodecylbenzenesulfonic acid |

COMPARATIVE EXAMPLES 1 AND 2

The procedure described in Example A is followed, the ratios according to Example A7 being chosen. The dimethylolphenol (Comparative Example 1) or trimethylolphenol (Comparative Example 2) described in EP-A No. 97897 is used as the crosslinking component and reacted as described in Example C, the molar ratios of component A to component B corresponding to those of Examples C16 and C18, respectively.

Carrying out the Comparative Experiments

The demulsification experiments are carried out in a Rühlermoor crude oil emulsion from Northern Germany at 50° C. The water content of the emulsion is about 50%.

The stated amounts of oil demulsifiers, in ppm, are added, at 50° C., to 100 g of the crude oil emulsion, which contains 50% of water, and the mixture is stirred thoroughly. The mixture is then left to stand at 50° C., and the amount of clear water which has separated off after 10, 20, 30, 60, 120 and 240 minutes is measured.

Amount metered in: 10 ppm

| | \multicolumn{6}{c}{Amount of water which has separated off after ... minutes:} |
|---|---|---|---|---|---|---|
| | 10 | 20 | 30 | 60 | 120 | 240 |
| C16 | 1 | 4 | 5 | 49 | 50 | 50 |

-continued

Amount metered in: 10 ppm

| | \multicolumn{6}{c}{Amount of water which has separated off after ... minutes:} |
|---|---|---|---|---|---|---|
| | 10 | 20 | 30 | 60 | 120 | 240 |
| C17 | 1 | 2 | 5 | 50 | 51 | 51 |
| C18 | 0 | 5 | 14 | 50 | 50 | 50 |
| V1 | 0 | 0 | 0 | 0 | 3 | 20 |
| V2 | 0 | 0 | 0 | 0 | 1 | 4 |

As is evident from the test, products from Examples C16–C18 show complete demulsification after only 60 minutes, whereas the two comparative samples do not produce any separation.

We claim:
1. A polyether which is suitable as an oil demulsifier and which is obtained by reacting
   (A) a polyalkylene oxide obtained from ethylene oxide and propylene oxide and containing in total from 5 to 200 alkylene oxide units with
   (B) an alkylolation product of a low molecular weight aldehyde and a bis-(4-hydroxyphenyl)-methane of the formula II

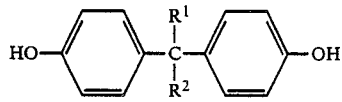

where $R^1$ and $R^2$ may be identical or different and are each hydrogen, low molecular weight alkyl, phenyl, carboxyl or low molecular weight alkoxycarbonyl, the molar reaction ratio of the compound of the formula II to the alkylolating aldehyde being from 1:1 to 1:4, at from 100° to 180° C. in the presence of an acidic catalyst with removal of the water of reaction, the weight ratio of A to B being from 5:1 to 1:3.

2. A polyether as defined in claim 1, obtained by converting
   (A) a polyalkylene oxide of the formula I

where A-O and B-O may be identical or different and are each a radical of ethylene oxide or propylene oxide and x and y are each from 0 to 100, with the proviso that the sum x+y is from 5 to 200.

3. A polyether is defined in claim 2, obtained by converting
   (A) a polyalkylene oxide of the formula I where x is from 1 to 40, y is from 5 to 60 and x+y is from 8 to 100.

4. A polyether as defined in claim 1, wherein a methylolation product of bis-(4-hydroxyphenyl)-methane or of 2,2-bis-(4-hydroxyphenyl)-propane is used as component B, the molar ratio of the bis-(4-hydroxyphenyl)-methane to the methylolating agent formaldehyde being from 1:3 to 1:4.

* * * * *